Sept. 28, 1965  E. OKLEJAS  3,208,647
VALVE SYSTEM
Filed April 26, 1962
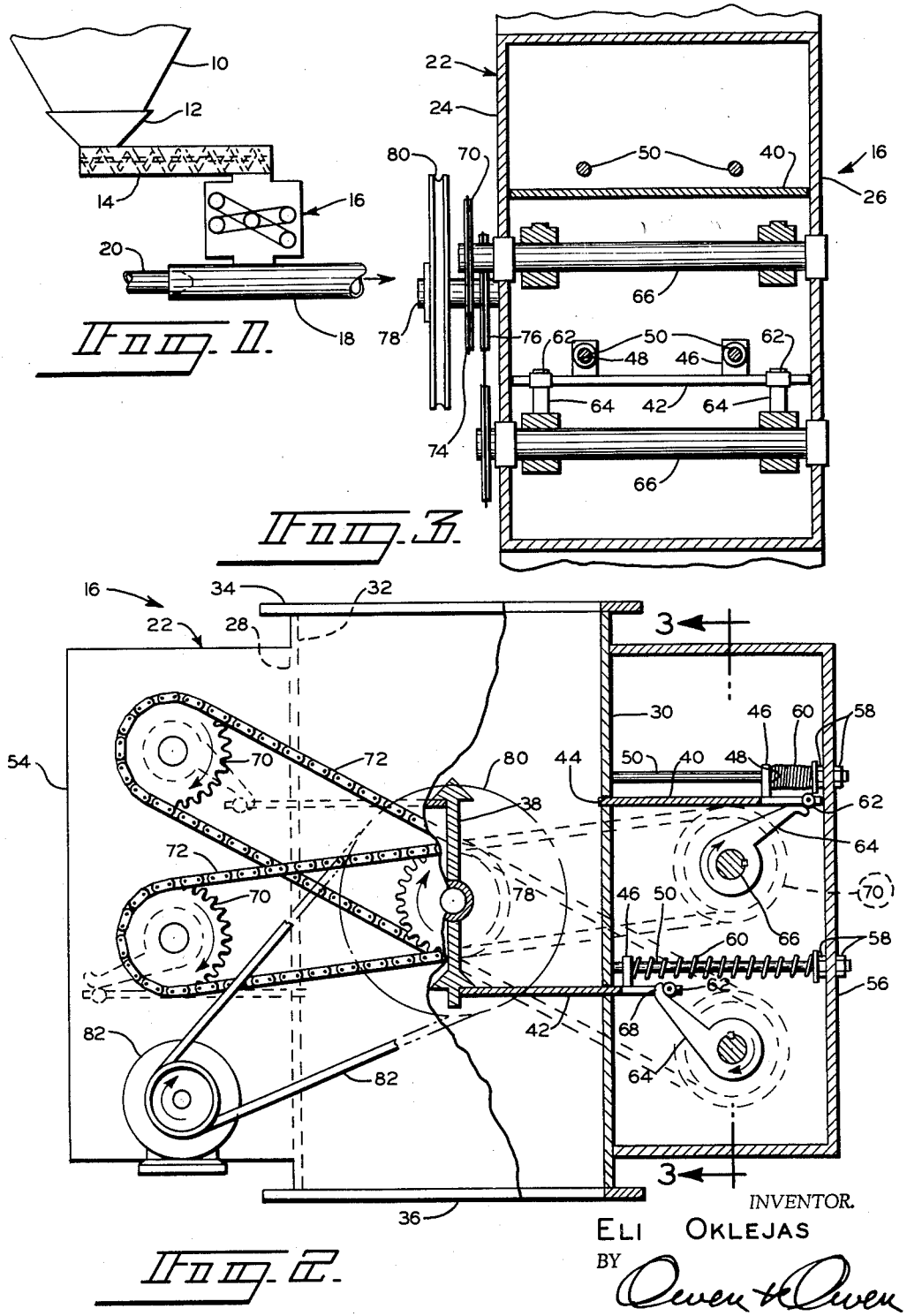
INVENTOR.
ELI OKLEJAS
BY Owen & Owen
ATTORNEYS United States Patent Office 3,208,647
Patented Sept. 28, 1965

3,208,647
VALVE SYSTEM
Eli Oklejas, 3311 Lakeview Drive, Baycrest Beach,
Monroe, Mich.
Filed Apr. 26, 1962, Ser. No. 190,348
3 Claims. (Cl. 222—447)

This invention relates to a new valve system and, more particularly, to a valve system to facilitate the transfer of powdered material from a source to a pneumatic conveyor or other space under a different pressure than the source.

Valve systems of the general nature with which the present invention is concerned are known in the art. The object of such systems is to enable a powdered material to be transferred from a source to a pneumatic conveyor or the like at a pressure which is different from and usually higher than the source, while keeping leakage at a minimum. The valve system according to the invention provides a unique arrangement of valve members and a unique method of opening and closing them. The valve system includes two valve members which are operated in a manner such that one valve member is always closed and in which both are moved from an open to a closed position at a rate greatly in excess of the rate at which they are opened. A minimum amount of time is thereby lost during the closing of the valve members yet the slower opening movement assures that all of the intended powdered material will pass by them. The valve system has synchronizing means so that the valve members are never open at the same time and thereby allow the escape of fluid under pressure from the conveyor back to the source. The valve system according to the invention also provides a novel double arrangement of vale members and an improved mechanical arrangement for operating the valves.

It is, therefore, a principal object of the invention to provide an improved valve system having the features and advantages outlined above.

Other objects and advantages of the invention will be apparent from the following detailed description of a preferred embodiment thereof, reference being made to the accompanying drawing, in which:

FIG. 1 is a schematic view of a conveying system embodying a pneumatic valve system according to the invention;

FIG. 2 is an elevational view, with parts broken away and with parts in cross section, of the valve system shown schematically in FIG. 1; and FIG. 3 is a view in cross section taken along the line 3—3 of FIG. 2.

Referring to the drawing, and more particularly to FIG. 1, a typical conveying arrangement is shown as an illustration of one application for the valve system according to the invention. A hopper 10 contains powdered material such as cement which is to be transferred to another storage space such as a silo, for example. A spout 12 at the bottom of the hopper 10 connects it to a screw conveyor 14, the opposite end of which is connected to the top of a valve system 16 according to the invention. The bottom of the valve system 16 is connected to a pneumatic conveying tube 18 to which air under high pressure and velocity is supplied from a suitable nozzle 20 to convey the powdered material in a generally fluidized condition to the desired destination (not shown). The valve system 16 enables the powdered material to move downwardly from the screw conveyor 14 and into the conveying tube 18 and yet prevents the air under pressure in the tube 18 from leaking upwardly appreciably out of the tube 18.

Referring more particularly to FIGS. 2 and 3, the valve system 16 includes a main housing 22 having front and rear walls 24 and 26 and side walls 28 and 30 forming a connecting passage 32 capable of directing the powdered material from the screw conveyor 14 to the conveying tube 18. The valve system 16 is connected to the screw conveyor 14 by a suitable upper connecting flange 34 and is connected to the conveying tube 18 by a suitable lower flange 36. The front and rear walls 24 and 26 extend beyond the side walls 28 and 30 to form mounting plates for the valve mechanism, to be discussed subsequently, and the outer edges of the front and rear walls form enclosures which can be at approximately the same pressure as that within the passage 32. This eliminates the need for special seals and maintains leakage at a minimum.

A partition 38 separates the passage 32 into two portions, each of which has a first valve member 40 and a second valve member 42, the first one being closer to the source of the powdered material than the second. Each of the valve members 40 and 42 has a closed position in which it extends completely across its portion of the passage 32 and is in contact with the partition 38 and also has an open position in which it is withdrawn to the side wall 28 or 30, extending through slots 44 therein.

From a broad standpoint, the operation of the valve members is known in the art. When the valve member 42 is in its closed position, as shown, the valve member 40 is in its open position, as shown, enabling the cement or other powdered material from the screw conveyor 14 to fall into the space in the passage 32 between the two valve members. The first valve member 40 is then closed and the second valve member 42 is opened to enable the cement to pass by this member and drop into the pneumatic tube 18.

The desired movement of the valve members is effected by the following mechanism and apparatus. The rear portion of each of the valve members 40 and 42 which lies outside the passage 32 has a pair of upwardly extending ears 46 with openings 48 through which guide rods 50 extend to maintain the movement of the valve members 40 and 42 in a fixed plane. The guide rods 50 are, in this instance, mounted on an end wall 54 or 56 by a pair of nuts 58 threadedly engaged on the end of the rod, with one of the nuts 58 on each side of the end wall 54 or 56. Encompassing each of the guide rod 50 between the ear 46 and the nuts 58 is a spring 60 which constantly urges the ear 46 and the valve member 40 or 42 toward its closed position.

Projections or rollers 62 are attached to the valve members 40 and 42 in slotted portions near the rear thereof, each of which rollers is engaged by a rotating arm 64. Pairs of the arms 64 are affixed to suitable shafts 66 which are rotatably supported through suitable bearings at the front and rear walls 24 and 26. The arms 64, rotated in a clockwise direction in this instance, move the valve members 40 and 42 rearwardly toward the open position when they engage the projections 62. This movement begins when a curved end portion 68 of the arm 64 contacts the projection 62 as shown for the right-hand, second valve member 42 in FIG. 2. The movement toward the open position continues until the arm 64 moves out of contact with the projection 62, which is about to occur for the right-hand first valve member 40 in FIG. 2. The instant the arm 64 moves out of contact with the projection 62, the spring 60 moves the valve member 40 or 42 quickly to its closed position. Hence, the valve members 40 and 42 have a relatively slow opening movement, depending upon the speed of rotation of the arms 64, and have a very rapid closing movement, made possible by the springs 60. This assures that the powdered material to be conveyed will pass by the valve members during their opening movement, because sufficient time elapses to enable this to be possible, and yet no lost time is involved in closing the valve members.

While only one pair of the arms 64 is shown for each of the valve members 40 and 42, more than one pair can be used so that the valve member will open and close more than once for each revolution of the shaft 66. If two pairs are used for each valve member, each pair must contact the member for not more than one-fourth a revolution, which can be controlled by the length of travel of the valve member and the length of the arms 64.

The shafts 66 are driven through suitable sprockets 70 located outside the front wall 24, with the diagonally opposite sprockets 70 being connected by chains 72. The chains 72 are engaged by a central pair of drive sprockets 74 and 76 (FIG. 3) mounted on a common drive shaft 78 which is rotatably supported by the housing 22 and synchronizes movement of the shaft 66 so that both valve members on one side of the partition 38 are not open at the same time. Also, the movement of the valve members on each side of the partition is controlled so that the corresponding valve members open alternately. This assures a more constant flow of powder through the passage 32. The drive shaft 78 is driven by means of a large pulley 80 which is driven by a motor and reducer 82 (FIG. 2) through a belt 84. The arms 64 for the left-hand valve members 40 and 42 are located on the upper sides thereof rather than on the lower sides so that the same direction of rotation can be retained for all of the shafts 66. This enables the four shafts 64 to be driven by relatively simple mechanism.

Various modifications of the above described embodiments of the invention will be apparent to those skilled in the art and it is to be understood that such modifications can be made without departing from the scope of the invention, if they are within the spirit and tenor of the accompanying claims.

What I claim is:

1. A valve system to transfer material from a source to an enclosed space containing fluid under a pressure different than the pressure at said source, said system comprising passage means connecting said source and said space, a partition extending longitudinally of said passage means and dividing it into a first portion and a second portion, a first and a second generally planar valve member in each of said portions, said first valve members being closer to said source than said second valve members, each of said valve members having a closed position and an open position, first means for moving each of said first valve members from its closed position to its open position in a direction parallel to the plane of said first valve member, second means for moving each of said first valve members from its open position to its closed position in a direction parallel to the plane of said first valve member, upon reaching its open position, at a speed greatly in excess of the speed at which it is moved from its closed position to its open position, third means for moving each of said second valve members from its closed position to its open position in a direction parallel to the plane of said second valve member, fourth means for moving each of said second valve members from its open position to its closed position in a direction parallel to the plane of said second valve member, upon reaching its open position, at a speed greatly in excess of the speed at which it is moved from its closed position to its open position, first drive means for driving said first moving means associated with the first valve member in one portion and the third moving means associated with the second valve member in the other portion, second driving means for driving the first moving means associated with the first valve member in the other portion and the third moving means of the second valve member in the one portion, and means synchronizing the first and second driving means so that said first valve members are opened alternately and said second valve members are opened alternately.

2. A valve system to transfer material from a source to an enclosed space containing fluid under a pressure different than the pressure at said source, said system comprising passage means connecting said source and said space, a first and a second valve member in said passage means, said first valve member being closer to said source than said second valve member, each of said valve members having a closed position and an open position, first means for moving said first valve member from its closed position to its open position including a first rotatable arm engageable with and disengageable from said first valve member, said arm moving said first valve member from its closed position to its open position along a lineal path when engaged therewith, second means for moving said first valve member from its open position to its closed position, upon reaching its open position and being disengaged from said first rotatable arm, at a speed greatly in excess of the speed at which first valve member is moved from its closed position to its open position, third means for moving said second valve member from its closed position to its open position including a second rotatable arm engageable with and disengageable from said second valve member, said second arm moving said second valve member from its closed position to its open position along a lineal path when engaged therewith, fourth means for moving said second valve member from its open position to its closed position, upon reaching its open position and being disengaged from said second arm, at a speed greatly in excess of the speed to which said second valve member is moved from its closed position to its open position, and driving and synchronous means for simultaneously driving all of said arms and for controlling said first and said third means so that said first valve member is opened only when said second valve member is substantially completely closed, and said second valve member is opened only when said first valve member is substantially completely closed.

3. A system according to claim 2 wherein each of said second and fourth means comprises resilient means constantly urging its associated valve member toward the closed position, the force of said resilient means being overcome by the associated rotating arm when engaged with the associated valve member.

References Cited by the Examiner

UNITED STATES PATENTS

| | | | |
|---|---|---|---|
| 350,503 | 10/86 | Ricards | 222—447 |
| 421,421 | 2/90 | McDaniel | 222—447 X |
| 1,204,274 | 11/16 | Howard | 222—447 |
| 2,510,866 | 6/50 | Currier | 222—447 X |
| 2,694,497 | 11/54 | Stock | 137—614.11 X |
| 2,723,057 | 11/55 | Golden | 222—447 X |
| 2,817,463 | 12/57 | Stokes | 222—447 X |
| 2,949,275 | 8/60 | Pro | 222—447 X |
| 3,058,498 | 10/62 | Vogt | 222—1 X |

RAPHAEL M. LUPO, *Primary Examiner.*

WILLIAM F. ODEA, *Examiner.*